(12) United States Patent
Hamada

(10) Patent No.: US 8,244,264 B2
(45) Date of Patent: Aug. 14, 2012

(54) RADIO BASE STATION RECEIVER AND PROGRAM

(75) Inventor: Seiji Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 505 days.

(21) Appl. No.: 11/528,368

(22) Filed: Sep. 28, 2006

(65) Prior Publication Data

US 2007/0275681 A1 Nov. 29, 2007

(30) Foreign Application Priority Data

May 26, 2006 (JP) ................................. 2006-147280

(51) Int. Cl.
*H04W 72/00* (2009.01)

(52) U.S. Cl. .................. 455/452.1; 455/450; 455/452.2; 455/464; 455/509; 455/561; 370/320; 370/329; 370/335; 370/341

(58) Field of Classification Search .................... 455/77, 455/161.1, 179.1, 185.1, 450, 509, 561, 21, 455/293, 337, 452.1, 464; 370/320, 329, 370/335, 341, 342
See application file for complete search history.

(56) References Cited

U.S. PATENT DOCUMENTS

| | | | | |
|---|---|---|---|---|
| 5,784,360 | A * | 7/1998 | I et al. ........................... | 370/252 |
| 6,195,362 | B1 * | 2/2001 | Darcie et al. .................. | 370/431 |
| 6,400,966 | B1 * | 6/2002 | Andersson et al. ............ | 455/561 |
| 6,452,911 | B1 * | 9/2002 | Seo ................................. | 370/335 |
| 6,608,534 | B2 * | 8/2003 | Kushitani et al. ............. | 333/126 |
| 6,970,709 | B1 | 11/2005 | Williams | |
| 2002/0147030 | A1 * | 10/2002 | Chun et al. .................... | 455/561 |
| 2005/0118989 | A1 | 6/2005 | Agin | |
| 2006/0023628 | A1 | 2/2006 | Uchara et al. | |
| 2007/0116018 | A1 * | 5/2007 | Doleh et al. .................. | 370/401 |

FOREIGN PATENT DOCUMENTS

| | | |
|---|---|---|
| EP | 0 844 800 A2 | 5/1998 |
| JP | A-2005-72900 | 3/2005 |
| JP | A-2005-136986 | 5/2005 |
| WO | WO 99/18744 | 4/1999 |

OTHER PUBLICATIONS

Extended European search report; Application No. 06254892.0; Reference No. P107048EP00/DNL.
Communication from the European Patent Office for European App. No. 06254892.0-2412, dated Aug. 6, 2008.
3GPP TS 25.211 V7.3.0 (Sep. 2007) § 5.2.1.1 DPCCH and DPDCH; pp. 10-12.
3GPP TS 25.211 V7.3.0 (Sep. 2007) § 5.2.2 Common Uplink Physical Channels, § 5.2.2.1 Physical Random Access Channel (PRACH); pp. 14-16.
3GPP TS 25.211 V7.3.0 (Sep. 2007) § 5.3 Downlink Physical Channels, § 5.3.1 Downlink transmit diversity; p. 17.

* cited by examiner

*Primary Examiner* — Anthony Addy
*Assistant Examiner* — Khalid Shaheed
(74) *Attorney, Agent, or Firm* — Murphy & King, P.C.

(57) ABSTRACT

A resource allocation control unit is provided between the despreading process unit and the channel decoding process unit of a radio base station receiver, and a resource for a channel decoding process is allocated only when there is actually user communication data in a communication service that is not of a continuous data communication under control of the resource allocation control unit. Thereby, the number of resources of the channel decoding process unit is smaller than the number of resources for despreading processes corresponding to the number of users that can receive the services simultaneously.

8 Claims, 13 Drawing Sheets

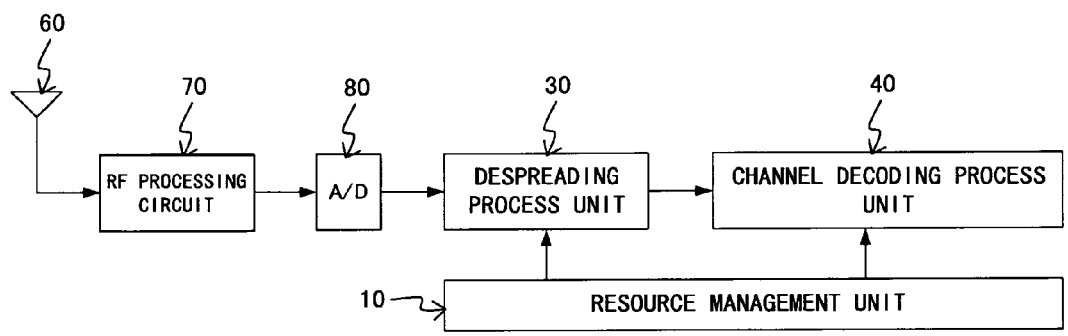
F I G. 1

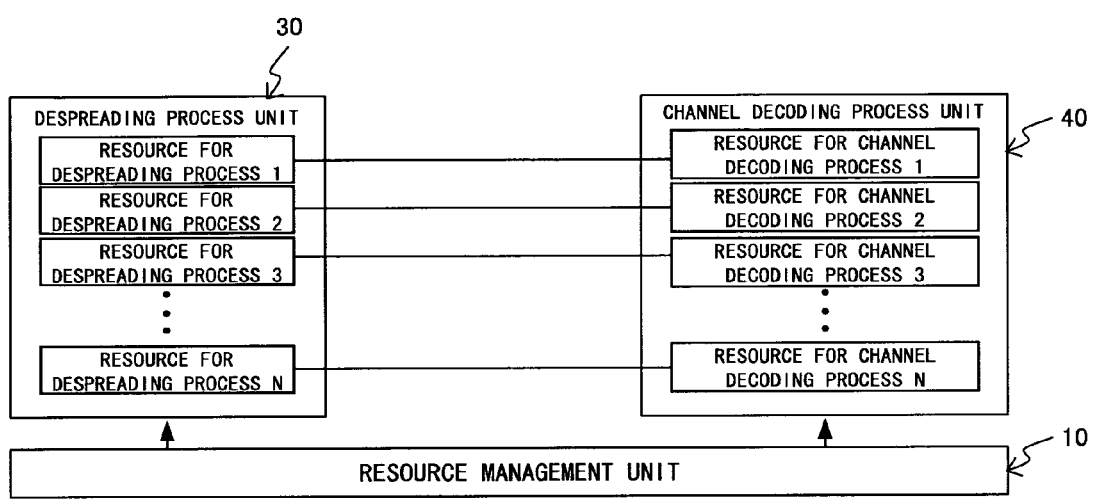
F I G. 2

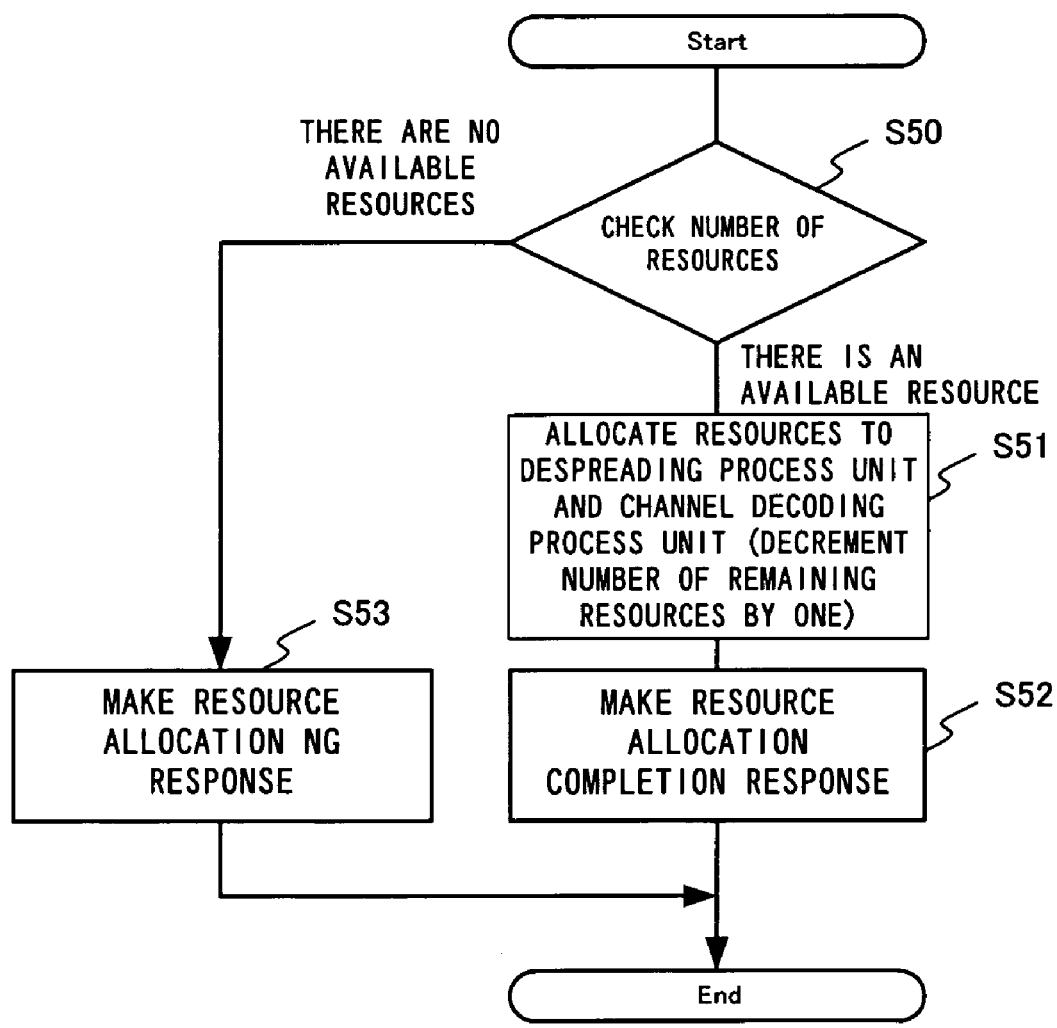
F I G. 3

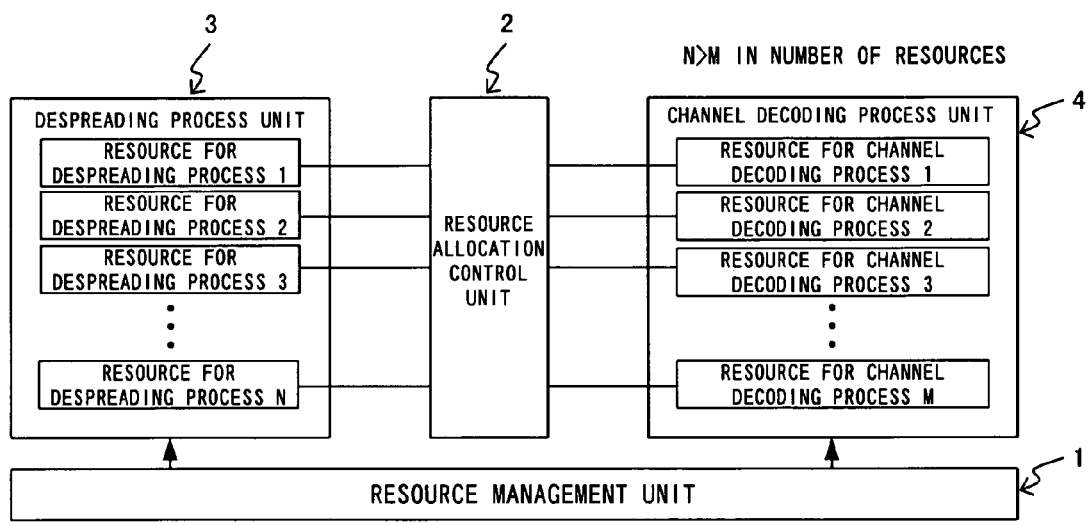
F I G. 4

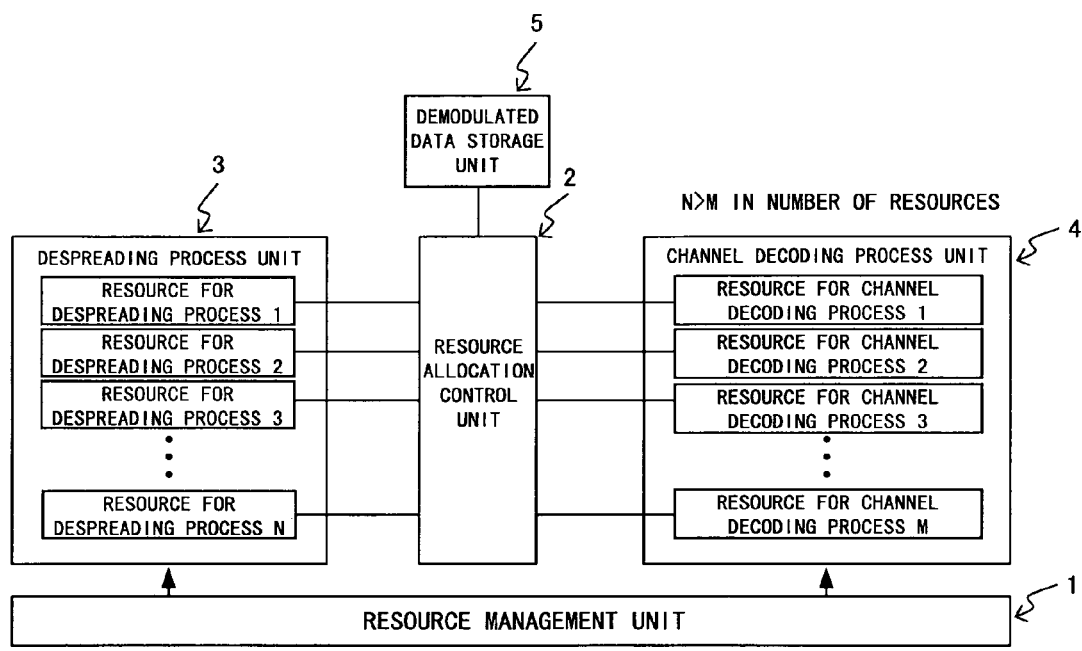
F I G. 8

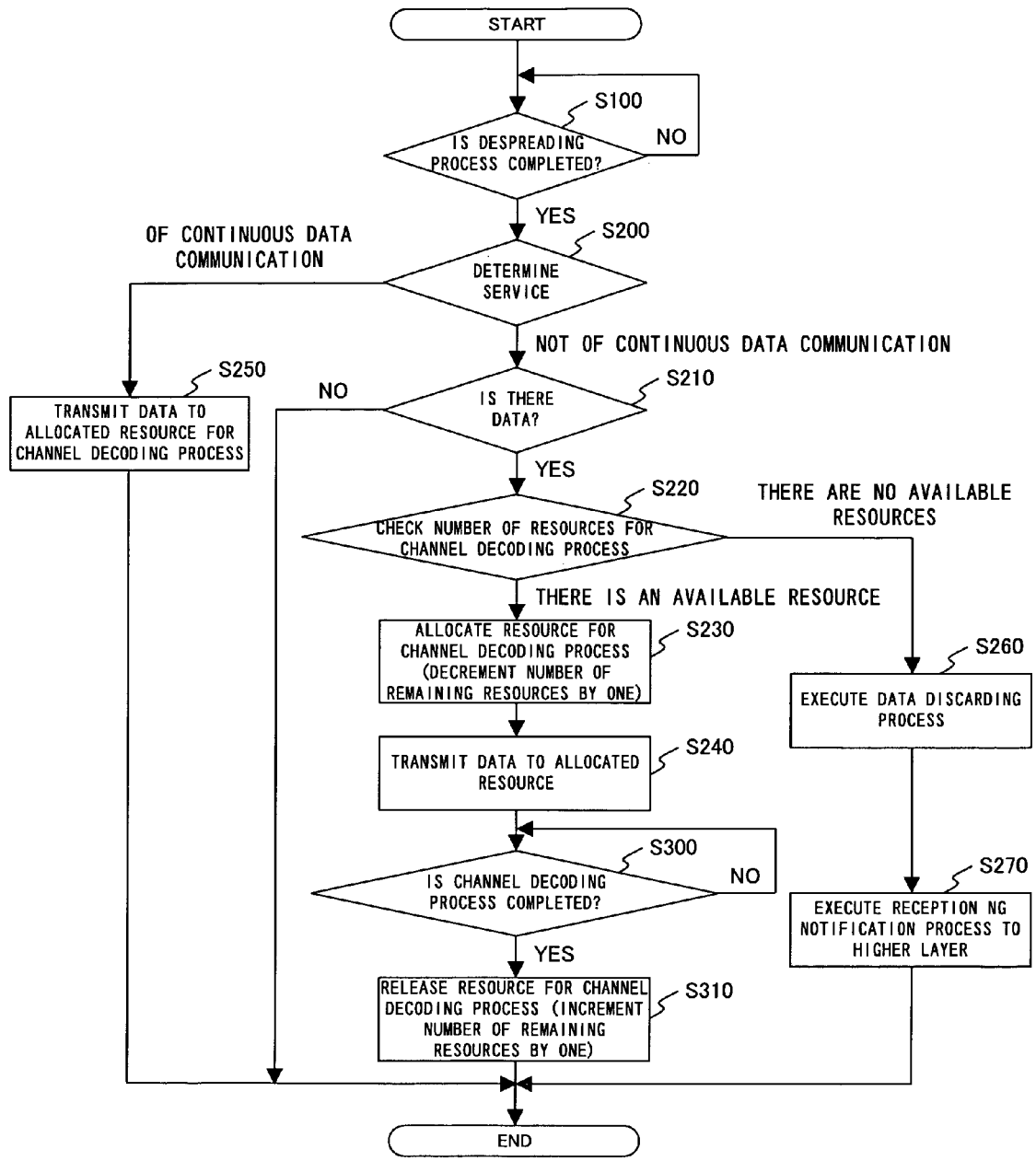
F I G. 1 1

COUNTER OF AVAILABLE
RESOURCES FOR DESPREADING
PROCESS $0 \leqq i \leqq N$

FIG. 12B  MANAGEMENT TABLE OF RESOURCES FOR DESPREADING PROCESS

| RESOURCE NUMBER FOR DESPREADING PROCESS | RESOURCE NUMBER FOR CHANNEL DECODING PROCESS | TYPE OF SERVICE |
|---|---|---|
| 1 | * | * |
| 2 | * | * |
| ⋮ | ⋮ | ⋮ |
| N | * | * |

COUNTER OF AVAILABLE RESOURCES FOR
CHANNEL DECODING PROCESS $0 \leqq j \leqq M$

FIG. 13B  MANAGEMENT TABLE OF RESOURCES FOR CHANNEL DECODING PROCESS

| RESOURCE NUMBER FOR CHANNEL DECODING PROCESS | RESOURCE NUMBER FOR DESPREADING PROCESS |
|---|---|
| 1 | * |
| 2 | * |
| ⋮ | ⋮ |
| M | * |

RADIO BASE STATION RECEIVER AND PROGRAM

BACKGROUND OF THE INVENTION

1. Field of the Invention

The present invention relates to a radio base station receiver that conducts reception of communication data from a plurality of users, and particularly to a method of managing process resources for processing received data of an uplink transmission (data transmitted from mobile terminals to the radio base station) in the radio base station receiver.

2. Description of the Related Art

Recently, a 3rd generation service started in mobile radio systems, and a CDMA (Code Division Multiple Access) method is used in the mobile radio systems of the 3rd generation. The mobile radio system of the CDMA method such as the above is disclosed in Patent Document 1 below.

FIG. 1 shows an example of a basic configuration of a radio base station receiver in a mobile radio system using the CDMA method. In the receiver shown in FIG. 1, received data of an uplink transmission is converted from data in a radio frequency band into digital data in a baseband frequency band by an RF (Radio Frequency) processing circuit 70 and an A/D (Analog/Digital) converter circuit 80 after being received by an antenna 60. A despreading process is executed by a despreading process unit 30 on the received data of the uplink transmission that has been converted into the digital data. Because the data demodulated through the despreading process was subjected to an encoding process (Viterbi encoding, Turbo encoding, or the like) by a channel coding process when being transmitted, a decoding process is executed on the demodulated data by a channel decoding process unit 40 in order to convert the data back into its original state. In the receiver, the number of resources for executing processes is limited depending on the processing capacity of the device; accordingly, the entire process amount is controlled by resource management unit 10 managing the resources.

FIG. 2 shows the despreading process unit 30, the channel decoding process unit 40, and resource management unit 10 for managing the resources of the despreading process unit 30 and channel decoding process unit 40 in a conventional example. In the conventional example, in order to simultaneously conduct reception of uplink data from a plurality of users, the resources for the despreading process by the despreading process unit 30 and the resources for the channel decoding process by the channel decoding process unit 40 are prepared such that they are of the same number, and the above resource management unit 10 conducts allocation such that the ratio of the resource for the despreading process to that for the channel decoding process is 1:1.

Next, a process flow of the above resource management unit 10 is explained by referring to FIG. 3.

Resource management unit 10 is activated by a resource allocation request from a higher layer, and checks the number of remaining resources in step S50. When the resource allocation cannot be conducted because there is no available resource, the process proceeds to step S53, and an NG response indicating that the allocation cannot be conducted is made to the higher layer in order to report resource depletion. When there are available resources, the resources are allocated to the despreading process unit 30 and the channel decoding process unit 40, the number of remaining resources is decremented by one in step S51, and a completion response of the resource allocation is made to the higher layer in step S52.

As mobile radio systems such as the above have realized higher speed and a broader band, not only conventional voice communications, but also various services utilizing packet communications have been realized. Accordingly, the percentage of communication data used in the packet data communication services to the uplink data received by the radio base station has increased.

Additionally, competition among network operators has become more intensive, and the infrastructures of the base stations and the like are increasingly required to be of a lower cost.

Patent Document 1

Japanese Patent Application Publication No. 2005-136986

Voice communication such as telephone calls or the like are included in types of continuous communications because the data to be received is continuously transmitted. In contrast, in communications such as packet data communications or the like, the data to be received does not arrive continuously.

In radio base station devices, in order to secure radio links between the base station device and terminal devices (in order to secure pilot synchronization), the despreading process has to be continuously executed for demodulating pilot signals even in communication services other than continuous communication services, such as packet data communication. However, when there is no user communication data to be transmitted, the channel decoding process unit does not have to operate.

In the conventional examples, as many resources for the channel decoding processes as there are resources for the despreading processes are required because the resources for the despreading processes and the resources for the channel decoding processes are managed such that the ratio therebetween is 1:1. Thus, even when a data process is not executed, the resources for the channel decoding processes for the maximum number of users to whom the service can be provided simultaneously are secured.

However, for packet communication, it is sufficient that the channel decoding process unit is used only when data is processed; accordingly, it is not necessary to occupy the resources for the channel decoding processes continuously.

In the conventional examples, in a device that conducts reception of data from a plurality of users such as the radio base station receiver, both of the resources for the despreading processes and the resources for the channel decoding processes are prepared such that they are of the same number as the users whose data is processed simultaneously. Accordingly, a problem is created in which the circuit scale of the radio base station receiver becomes large.

It is an object of the present invention to prevent the circuit scale of the radio base station receiver from becoming large, and to reduce the cost of the radio base station device.

SUMMARY OF THE INVENTION

In the present invention, a resource allocation control unit is provided between a despreading process unit and a channel decoding process unit of a radio base station receiver, and a resource for a channel decoding process is allocated only when there is actually user communication data in a communication service which is not of a continuous data communication by the resource allocation control unit.

Also, a radio base station receiver according to the present invention may have a demodulated data storage unit for putting the process to wait for a resource for a channel decoding process to become available.

According to the present invention, it is possible to reduce the number of resources required by the channel decoding process unit because the process method of the channel decoding process unit is controlled according to services. Accordingly, it is possible to reduce the scale of a circuit in the radio base station receiver. It is also possible to easily increase the number of users even when there are not so many resources for the channel decoding processes.

Therefore, according to the present invention, the resources for the channel decoding processes are used in common such that circuit efficiency is improved, and the channel decoding process unit can be used efficiently.

BRIEF DESCRIPTION OF THE DRAWINGS

FIG. 1 shows an example of a basic configuration of a radio base station receiver;

FIG. 2 shows a despreading process unit and a channel decoding process unit in a conventional example;

FIG. 3 shows an example of a process flow of a resource management unit in a conventional example;

FIG. 4 is a function block diagram of embodiment 1 of the present invention;

FIG. 8 is a function block diagram of embodiment 2 of the present invention;

FIG. 11 shows program processes when functions of the resource allocation control unit of embodiment 1 are realized by a computer;

FIGS. 12A and 12B show a counter and a table for managing resources for the despreading processes; and FIGS. 13A and 13B show a counter and a table for managing resources for the channel decoding processes.

DESCRIPTION OF THE PREFERRED EMBODIMENT

Figure 5:
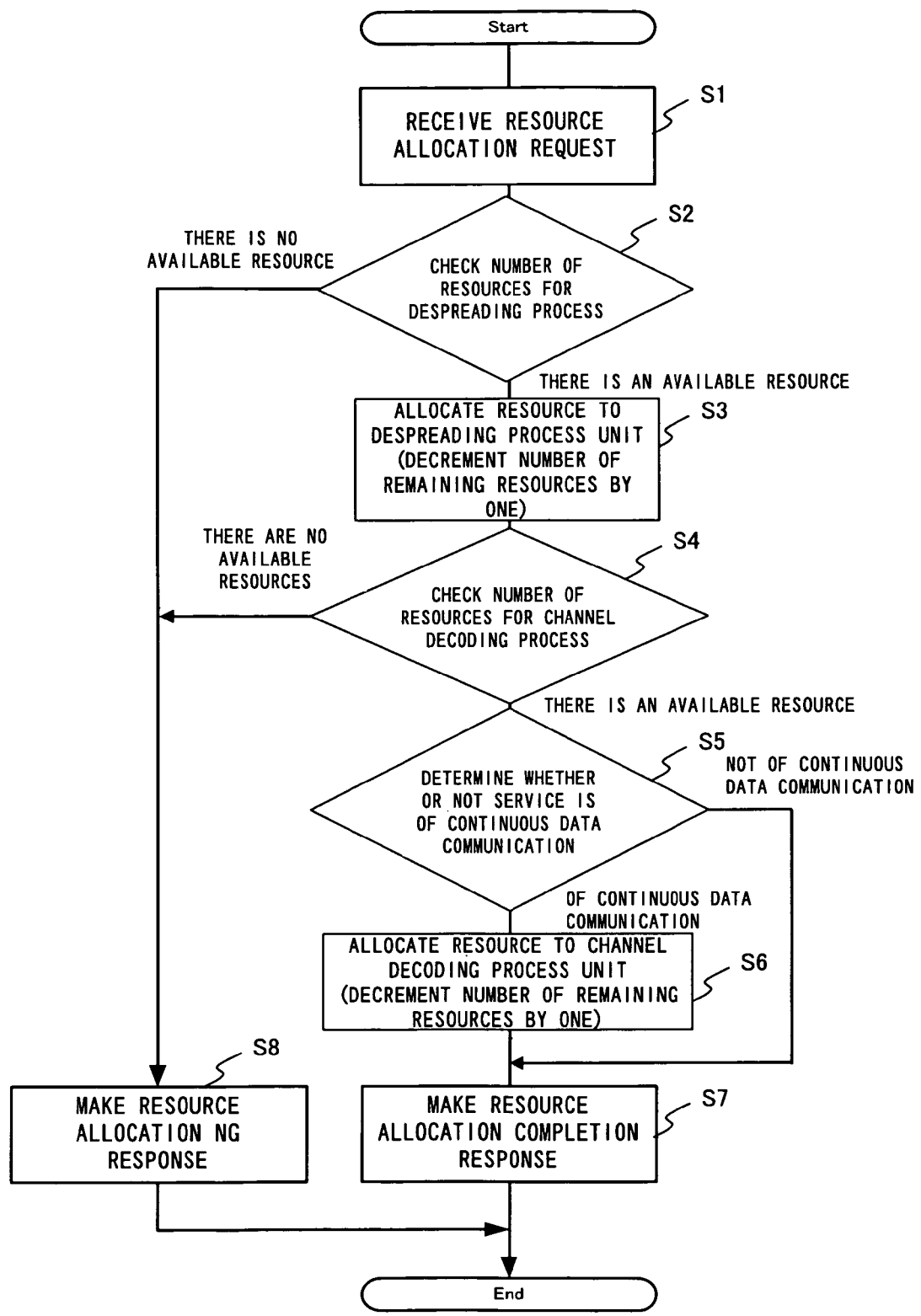
FIG. 5 shows an example of a process flow of a resource control unit according to the present invention.

First, embodiment 1 of the present invention is explained by referring to FIGS. 4 through 7. It is to be noted that expressions such as "allocate a resource for a despreading process to a despreading process unit 3" and the like used hereinbelow have the meaning "allocate a resource for a despreading process used for executing a despreading process on a received signal on which the despreading process should be executed in a despreading process unit".

FIG. 4 is a function block diagram of embodiment 1 of the present invention. The configuration of FIG. 4 is different from the conventional example of FIG. 2 in that a resource allocation control unit 2 is provided between the despreading process unit 3 and a channel decoding process unit 4, and that the maximum number M of resources for the channel decoding processes allocated to the channel decoding process unit 4 is smaller than the maximum number N of resources for the despreading processes allocated to the despreading process unit 3. Also, resource management unit 1 is different from resource management unit 10 of the conventional example in that resource management unit 1 allocates the resources for the despreading processes and the resources for the channel decoding processes separately.

The above respective function blocks can be realized by using hardware and also by using a combination of computer hardware and software. When a computer is utilized, it is possible for the respective functions to be realized by a single computer, and also for the respective functions to be realized by a system in which the functions are distributed to a plurality of computers.

FIG. 5 shows an example of a process flow of resource management unit 1 according to the present invention.

Resource management unit 1 starts processing when it receives a resource allocation request from a higher layer (step S1) at the start of a communication, and checks the number of remaining resources for the despreading processes. When the check result identifies that there are no available resources, resource management unit 1 executes step S8 in order to make an NG response, to the higher layer, indicating that it cannot allocate the resource, and terminates the process. When it is recognized that there is an available resource, resource management unit 1 allocates the resource for the despreading process in response to the resource allocation request from the higher layer. Then, resource management unit 1 executes step S4 after decrementing the number of remaining resources for the despreading processes by one.

In step S4, resource management unit 1 checks the number of remaining resources for the channel decoding processes. When the check result identifies that there are no available resources, resource management unit 1 executes step S8, and terminates the process after making the NG response to the higher layer indicting that it cannot allocate a resource. When the check result identifies that there is an available resource, resource management unit 1 executes step S5.

In step S5, resource management unit 1 determines the type of communication service for which the resource allocation request has been made. This determination of the communication service type can be conducted based on a notification from the higher layer. When the check result identifies that the communication service is of a continuous data communication such as a voice communication, resource management unit 1 executes step S7 after allocating the resource for the channel decoding process in step S6. When it is recognized that the communication service is not of a continuous data communication, resource management unit 1 immediately executes step S7.

In step S7, resource management unit 1 returns a completion response of the resource allocation to the higher layer, and terminates the process.

As described above, resource management unit 1 allocates the resource for the channel decoding process depending on the type of service for which data is being processed. In resource management unit 1, the despreading process and the channel decoding process are always managed such that the ratio therebetween is 1:1 for the services including continuous data communication such as voice communication. However, in discontinuous data communications such as packet data communication, the resource for the channel decoding process is not allocated.

Figure 6:
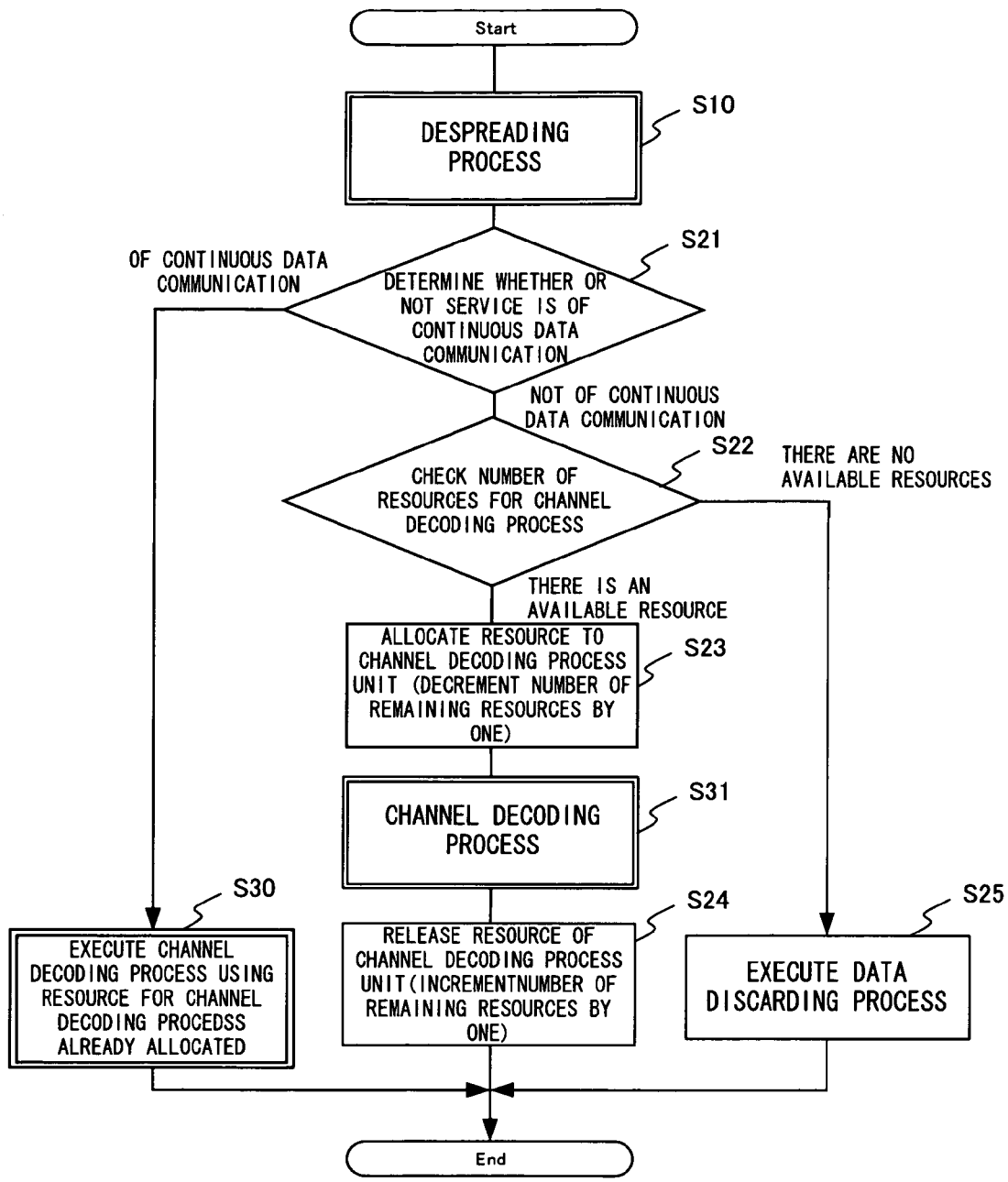
FIG. 6 shows a process flow of the entirety of a despreading process and a channel decoding process including a process of a resource allocation control unit of embodiment 1.

Next, a data process flow of the entirety of the despreading process and the channel decoding process including the process of the resource allocation control unit 2 of embodiment 1 is explained by referring to FIG. 6. In FIG. 6, the processes which are not enclosed by double lines are the processes of the resource allocation control unit 2. Step S10 enclosed by double lines is the process of the despreading process unit 3, and steps S30 and S31 enclosed by the double line are the processes of the channel decoding process unit 4.

When one despreading process of step S10 is completed by the despreading process unit 3, the received data demodulated as the process result is output from the despreading process unit 3 to the resource allocation control unit 2. In the resource allocation control unit 2, the type of communication service is determined first based on the data in step S21. In the case of continuous data communication, the channel decoding process is executed in step S30 by using the resource for the channel decoding process that has already been secured in step S6 by resource management unit 1 as explained in FIG. 5, and the process is terminated.

In the case of discontinuous data communication such as packet data communication, the presence/absence of user communication data is further confirmed. Although it is not shown, when there is no user communication data, the process is immediately terminated because the channel decoding process does not have to be executed.

When user communication data exists, then an attempt is made to secure a resource because the resource for the channel decoding process has not been allocated. Specifically, in step S22, the number of remaining resources is confirmed, and if there is an available resource, the resource is allocated to the channel decoding process unit 4 in step S23; thereafter, the number of remaining resources is decremented by one.

Then the process proceeds to step S31, in which the channel decoding process unit 4 executes the channel decoding process. After the channel decoding process, the resource is released, and the number of the remaining resources is incremented by one in step S24 in order to terminate the process.

If there is no available resource, the received data is discarded in step S25, and the process waits for a retransmission of the data. (In typical packet communication, when reception of data is not confirmed, the data is retransmitted.)

If data of a plurality of users is output from the despreading process unit 3 at the same time and the number of available resources is insufficient for the number of resources that needs to be allocated, the resources are allocated prior to any high rate communications while taking the entire throughput into consideration.

The above confirmation of the presence/absence of packet communication data, which is one of the important factors of the process flow of the present invention, is realized based on results of the despreading process. In the case of the 3GPP (3rd Generation Partnership Project), as for a DCH (Dedicated Channel), the confirmation is realized based on the demodulation result of a TFCI (Transport Format Combination Indicator), and as for packet transference using a RACH (Random Access Channel), the confirmation is realized based on a preamble reception result. In the above case in which the resources are allocated prior to high rate communications, rate information can be obtained based on the TFCI of a DPDCH (Dedicated Physical Data Channel), for example.

Figure 7:
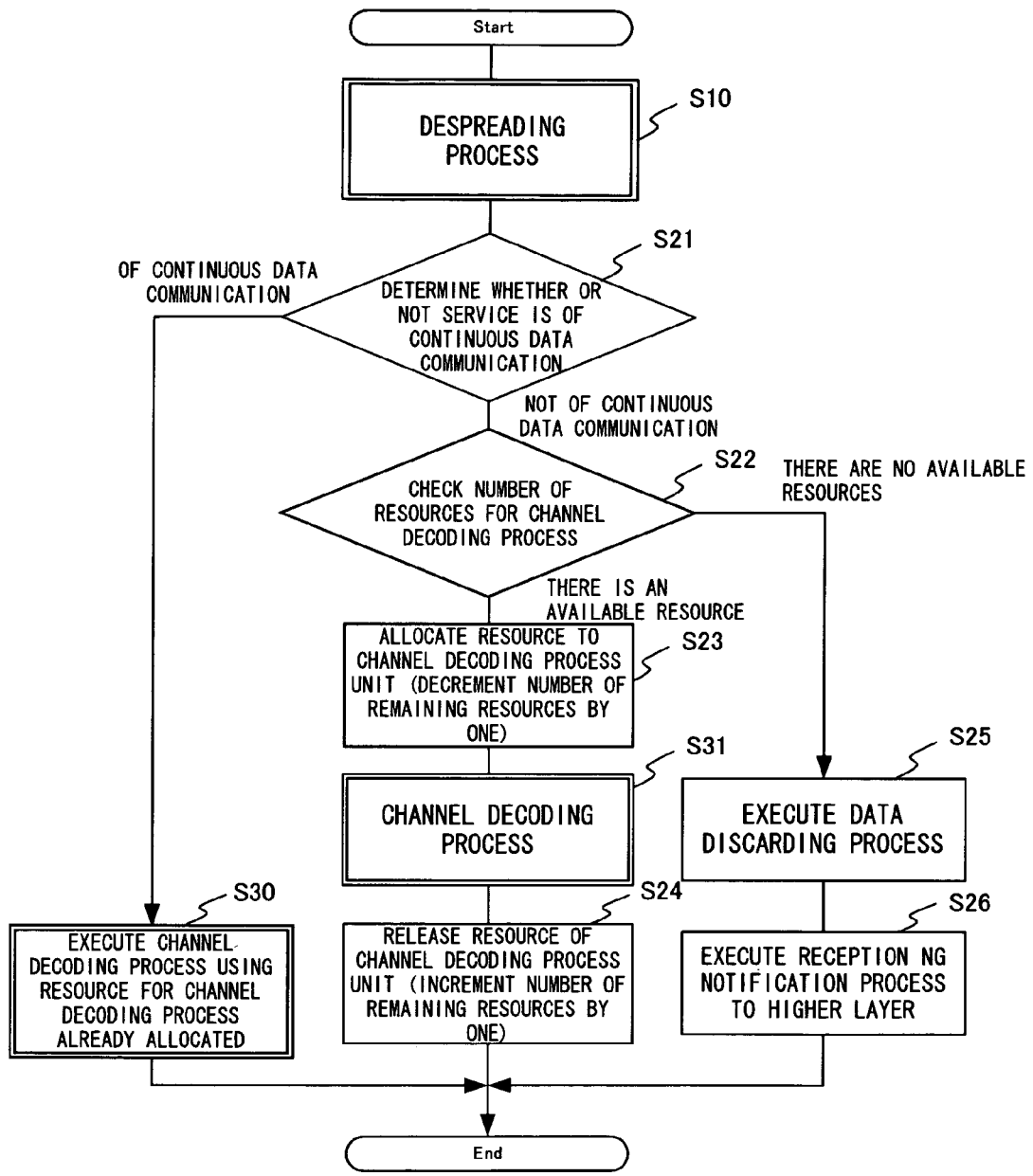
FIG. 7 shows a variation of the process flow of the resource allocation control unit of embodiment 1.

Next, by referring to FIG. 7, a variation of the data process flow of the resource allocation control unit 2 of embodiment 1 is explained. The process flow of FIG. 7 is different from that of FIG. 6 only in that the flow of FIG. 7 includes, after step S25 of the data discarding process, step S26 in which a reception NG is reported to the higher layer when discarding the data. By this configuration, earlier retransmission of the data is promoted.

Figure 9:
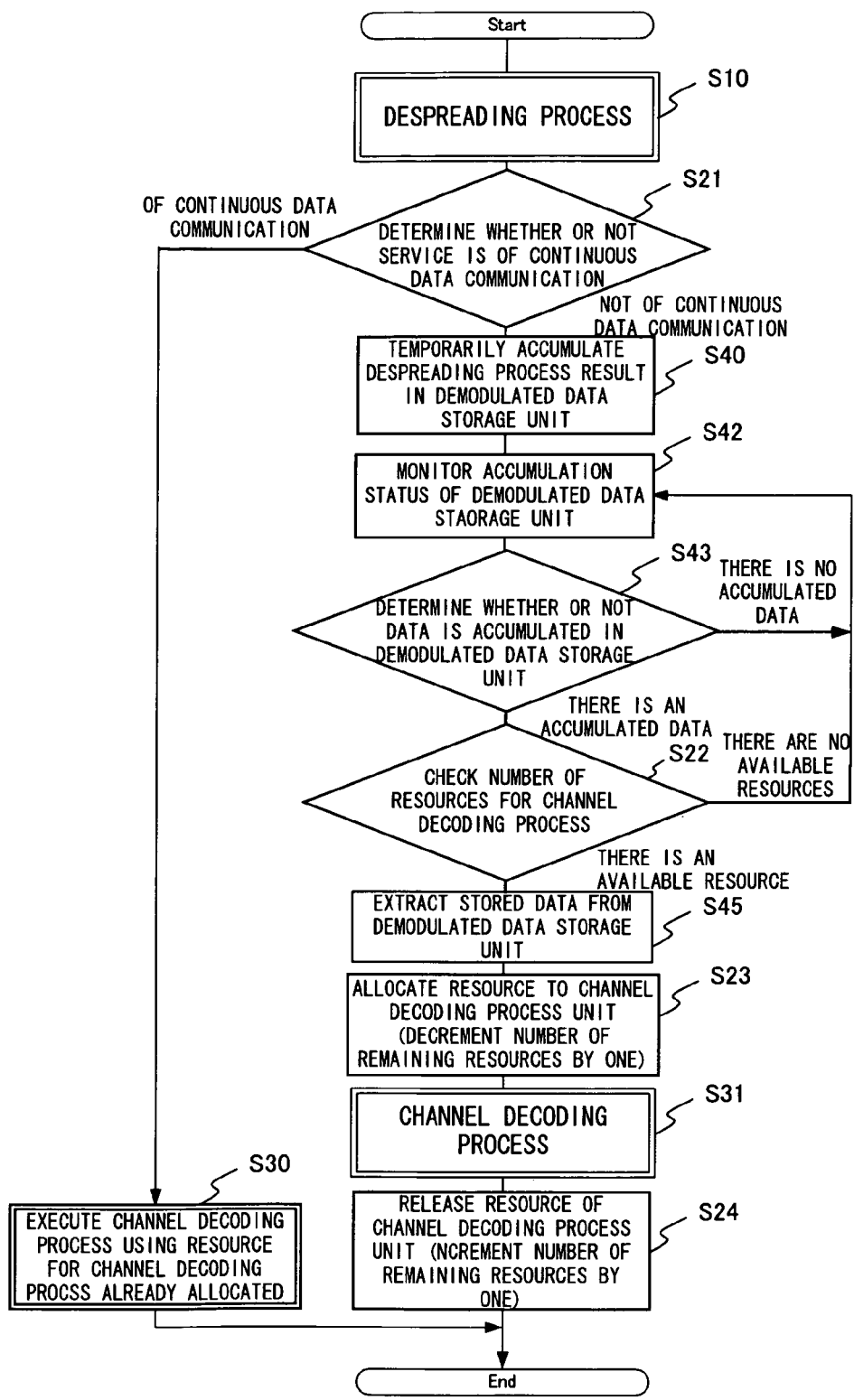
FIG. 9 shows a process flow of the entirety of a despreading process and a channel decoding process including process of a resource allocation control unit of embodiment 2.
Figure 10:
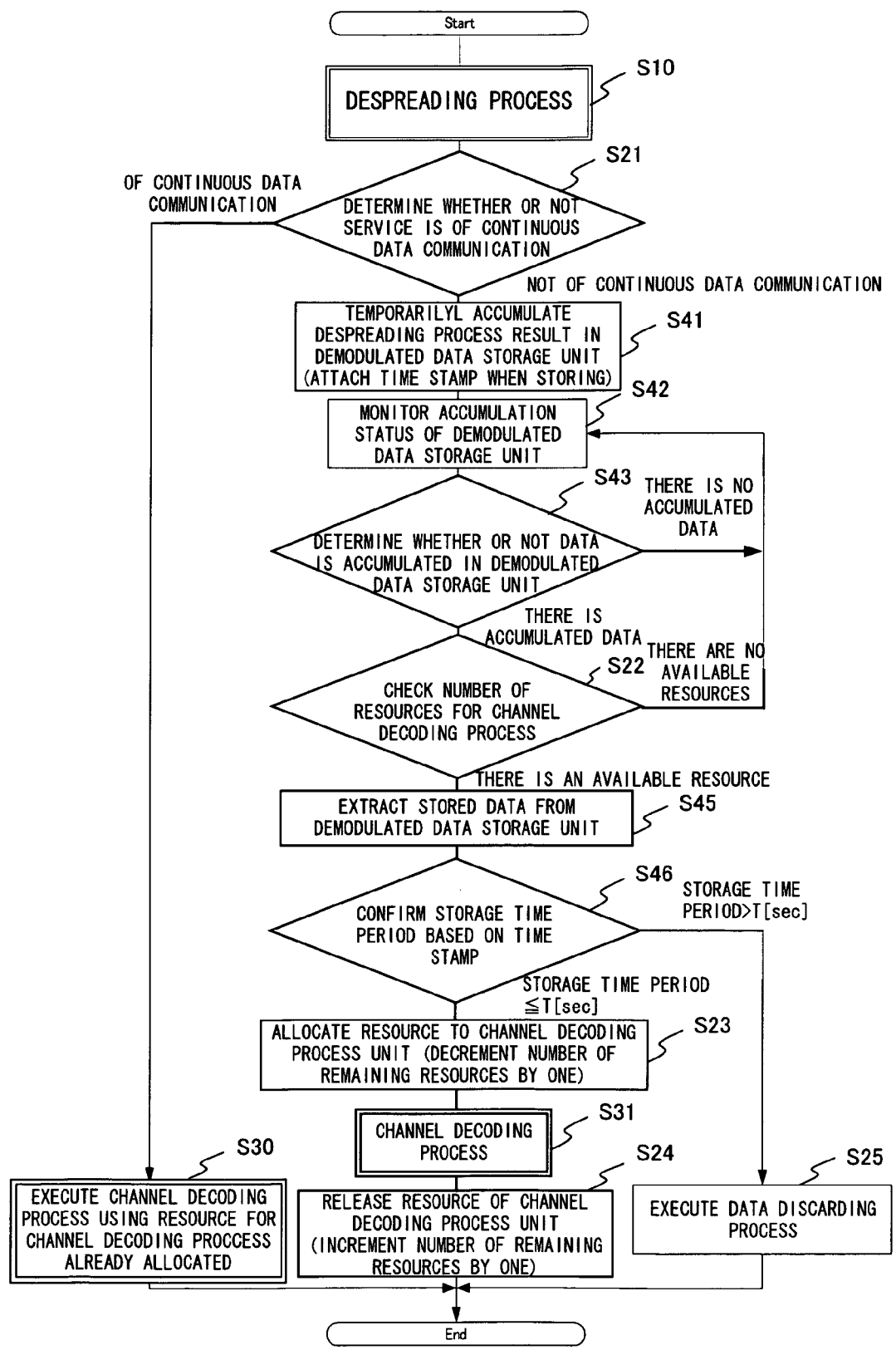
FIG. 10 shows a variation of the process flow of the resource allocation control unit of embodiment 2.

Next, embodiment 2 of the present invention is explained, by referring to FIGS. 8 through 10.

FIG. 8 is a function block diagram of embodiment 2 of the present invention. The function block diagram in FIG. 8 is different from that of embodiment 1 shown in FIG. 4 in that the function block diagram in FIG. 8 includes a demodulated data storage unit 5. In embodiment 2, by including the demodulated data storage unit 5, it is possible to wait until the resource for the channel decoding process becomes available while holding in the demodulated data storage unit 5 the demodulated signal as the despreading process result even when the resources for the channel decoding processes are depleted temporarily.

Accordingly, it is possible to process data when the resource for the channel decoding process becomes available in embodiment 2, while in embodiment 1, the demodulated signals have to be discarded when there is no available resource for the channel decoding process.

It is understood that operations of resource management unit 1 of embodiment 2 are the same as those of resource management unit 1 of embodiment 1.

Next, a process flow of the entirety of the despreading process and the channel decoding process the including process of the resource allocation control unit 2 of embodiment 2 is explained by referring to FIG. 9. The process flow in FIG. 9 is different from that of embodiment 1 in FIG. 6 in that in the process flow in FIG. 9 includes, with the demodulated data storage unit 5 being added, step S40 in which the despreading process result in the demodulated data storage unit 5 is temporarily accumulated, steps S42 and S43 in which the accumulation status of the demodulated data storage unit 5 is monitored, a step in which the presence/absence of the accumulated data is determined, and step S45 in which the held data from the demodulated data storage unit 5 is extracted.

Specifically, similarly to the case of embodiment 1 shown in FIG. 6, when the process result of the despreading process unit 3 in step S10 is output, the resource allocation control unit 2 determines the type of communication service first based on the data in step S21. In the case of continuous data communication, the channel decoding process unit 4 executes the channel decoding process in step S30 by using the resource for the channel decoding process that has already been secured. In the case of discontinuous data communication such as packet data communication, the presence/absence of user communication data is further confirmed. Although it is not shown, when there is no user communication data, the process is immediately terminated because the channel decoding process does not have to be executed.

When there is user communication data, the demodulated signals are stored in the demodulated data storage unit 5 in step S40 and then an attempt is made to secure the resource because the resource for the channel decoding process has not been allocated.

The resource allocation control unit 2 continuously monitors the presence/absence of the demodulated signals that are accumulated in the demodulated data storage unit 5 and the number of remaining resources, as shown in steps S42, S43, and S22 in FIG. 9, reads the demodulated signals from the demodulated data storage unit 5 during a time period that allows securement of the resources, as shown in step S45, and allocates the resource for the channel decoding process and decrements the number of remaining resources by one, as shown in step S23.

If there is no available resource, the demodulated signals are kept storing in the demodulated data storage unit 5. The demodulated signals can be read from the demodulated data storage unit 5 in the order in which they are stored in the demodulated data storage unit 5. However, depending on the system, options such as changing the order in which the data of the communication of the highest communication rate are read or the like are also possible, taking the transmission rate of packet data into consideration.

When the resource for the channel decoding process is allocated in step S23, the channel decoding process unit 4 executes the channel decoding process by using the allocated resource in step S30, releases the resource after the process in step S24, and increments the number of remaining resources by one in order to terminate the process.

FIG. 10 shows a variation of the process flow of FIG. 9, in which a timer is provided for managing the time period during which the demodulated data is held in the demodulated data storage unit 5 in order to not process data that is too old. This configuration is based on the fact that it is highly probable that a retransmission request has already been made by the higher layer regarding received data that is accumulated for a long time, the process is waiting for the next retransmission data, and the higher layer cannot receive the delayed received data; specifically, it is highly probable that the accumulated data has become unnecessary. For example, when a storage time period (time period after demodulated data is output from the despreading circuit and accumulated in the demodulated data storage unit 5) exceeds an arbitrary value T[sec] (the value may be set for each device or for each user separately) depending on the system, the accumulated data is discarded.

The process flow shown in FIG. 10 is different from that in FIG. 9 in that in FIG. 10, step S40 in which the demodulated signals are accumulated in the demodulated data storage unit 5 as the despreading process result is replaced with step S41 in which a time stamp is attached when the demodulated signals are stored. Also, as a process after extracting the demodulated signals stored in the demodulated data storage unit 5 in step S45, step S46, in which the storage time period is checked based on the time stamp, is added.

Then, if the storage time period of the extracted demodulated signals has exceeded the prescribed T[sec], the process proceeds to step S25 where the corresponding demodulated signals are discarded, and the process is terminated.

Next, by referring to FIGS. 11 through 13A and 13B, program process examples of realizing the functions of the resource allocation control unit 2 of embodiment 1 by software on a computer are explained.

Figure 12A:
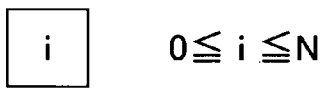
Figure 13A:
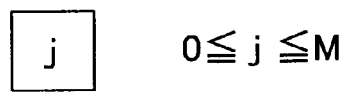

FIG. 11 shows an example of a program flow of the resource allocation control unit 2. This example of the program flow includes step S270, and corresponds to the variation example shown in FIG. 7. FIGS. 12A and 12B show a counter and a table for managing the resources for the despreading processes. FIGS. 13A and 13B show a counter and a table for managing the resources for the channel decoding processes.

As shown in step S100 of FIG. 11, the resource allocation control unit 2 waits for the process in the despreading process unit 3 to be completed. When a termination of one of the despreading processes by the resource for the despreading process and the number (numerical order) of the resource are recognized, then the resource allocation control unit 2 determines the type of communication service by referring to the management table of the resources for the despreading processes shown in FIG. 12B and accessing the service type of the entry that has the number of corresponding resource for the despreading process in step S200. This service type can be set on the management table of the resources for the despreading processes by resource management unit 1 based on notification from the higher layer at the start of the communication.

When the determination result of step S200 indicates a continuous data communication service, the process proceeds to step S250 where the demodulated signals as the despreading process result are transmitted to the resource for the channel decoding process that has the corresponding number on the management table of the resources for the despreading processes, and the process is terminated.

When the determination result of step S200 indicates a service that is not a continuous data communication, the process proceeds to step S210, and it is determined whether or not there is user communication data on which the channel decoding process should be executed. As already described above, in the case of, for example, 3GPP, as for the DCH, this determination can be realized based on the demodulation result of the TFCI, and as for packet transference using a RACH, it can be realized based on the preamble reception result.

When the determination result of step S210 indicates that there is no user communication data, the process is terminated.

When the determination result of step S210 indicates that there is user communication data, the process proceeds to step S220, and the number of available resources is checked by referring to the counter of available resources for the channel decoding processes shown in FIG. 13A. When there is no available resource, the process proceeds to step S260, the received data is discarded, a reception NG notification process to the higher layer is executed in step S270, and then the process is terminated.

When the determination result of step S220 indicates that there is an available resource, in step S230 the management table of the resources for the channel decoding processes of FIG. 13B is referred to, one of the resources for the channel decoding processes that are not associated with the resources for the despreading processes is allocated in such a way that it is associated with the resource for the current despreading process, and the corresponding number is written in the entry of the allocated resource for the channel decoding process on the management table of the resources for the channel decoding processes. Also, the counter value of the available resources for the channel decoding processes is decremented by one.

Next, the process proceeds to step S240 in which the demodulated user communication data is transferred to the resource for the channel decoding process allocated in step S230.

Next, in step S300, the completion of the channel decoding process by the channel decoding process unit 4 is waited for. When it is recognized that the channel decoding process, by using the allocated resource for the channel decoding process, is completed, in step S310 the resource for the channel decoding process is released by deleting the number of the resource for the despreading process written in the entry of the resource for the channel decoding process that has been completed, and the counter value of the available resources for the channel decoding processes is incremented by one. Thereafter, the process is terminated.

Although the above processes from step S100 to step S310 have been described as processes in series in the above explanation, it is obvious to those skilled in the art that a configuration is also possible in which the waiting processes of step S100 and step S300 are separated from processes of other steps, and a plurality of processes of resource allocation and resource release are executed in parallel.

Also, as is obvious from the process flow in FIG. 9, the example of program flow of embodiment 2 can be obtained by adding a process between step S210 and step S220 in which demodulated signals in the demodulated data storage unit 5 are temporarily stored and a process in which the accumulation status of the demodulated data storage unit 5 is monitored, and by further adding a process between step S220 and step S230 in which the stored data from the demodulated data storage unit 5 is monitored.

Next, the counters, the tables and the like for managing resources shown in FIG. 12A, FIG. 12B, FIG. 13A, and FIG. 13B are explained.

FIG. 12A shows the counter of available resources for the despreading processes that is for indicating the number of remaining resources for the despreading processes that can be allocated to the despreading process unit 3 and whose initial value is N, being the maximum number that can be allocated. The value of the counter of the available resource for the despreading process is managed by resource management unit 1. Resource management unit 1, receiving a resource allocation request from a higher layer in step S2 of FIG. 5, determines whether or not there is an available resource by referring to the counter value of available resources for despreading processes, and allocates the resource when there is an available resource. Thereafter, resource management unit 1 decrements the counter value of available resources for the despreading processes.

Although it is not shown, resource management unit 1, receiving a communication termination notification from the higher layer, executes a release process of the resource, and increments the value of the counter.

As described above, FIG. 12B shows the management table of the resources for the despreading processes where the number of resources for the channel decoding processes respectively associated with the numbers 1, 2, . . . , N of the resources for the despreading processes and the types of communication services utilizing the corresponding resources are stored. This table is accessed and managed by both resource management unit 1 and the resource allocation control unit 2.

FIG. 13A shows the counter of available resources for the channel decoding processes; this counter is for indicating the number of remaining resources for the channel decoding processes that can be allocated to the channel decoding process unit 4 and whose initial value is M, being the maximum number that can be allocated. By making the value M smaller than the value N, the scale of the device and the cost are reduced in the present invention.

As described above, FIG. 13B shows the management table of the resources for the channel decoding processes where the numbers of the resources for the channel decoding processes respectively associated with the numbers 1, 2, . . . , M of the resources for the channel decoding processes are stored.

The counter of available resources for the channel decoding processes and the management table of the resources for the channel decoding processes are respectively accessed and managed by both resource management unit 1 and the resource allocation control unit 2.

As described in detail above, according to the present invention, in services that are not of continuous data communication, such as a packet communication service, a resource for a channel decoding process is allocated only when user communication data is transmitted; accordingly, it is possible to prevent the scale of the channel decoding process unit and also of the entirety of the receiver from becoming large even when the number of users that can receive services simultaneously increases, and it is also possible to contribute to a reduction in the cost of the radio base station.

What is claimed is:

1. A radio base station comprising:
a plurality of despreading process resources used for generating demodulated data in executing a despreading process on a received signal;
a resource management unit to allocate one of the plurality of despreading process resources and to determine whether a type of communication service is of a continuous data communication upon receiving a resource allocation request from a higher layer apparatus, to allocate a channel decoding process resource when the communication service is determined to be of the continuous data communication, and to return a completion response to the higher layer apparatus and terminate allocation of the channel decoding process resource when the communication service is determined to be not of the continuous data communication, the completion response indicating completion of allocation of the despreading resource;
a resource allocation control unit to determine whether a type of communication service is of a continuous data communication for data on which the despreading process was executed, after the despreading process is completed; and
a demodulated data storage unit;
wherein
when the communication service is determined to be of the continuous data communication, the allocated channel decoding process resource executes a channel decoding process,
when the communication service is determined to be not of the continuous data communication, presence/absence of user communication data is further confirmed, when there is user communication data, the channel decoding process resource is allocated, and when there is no user communication data, allocation of the channel decoding process resource is terminated,
the resource management unit temporarily accumulates a demodulated signal in the demodulated data storage unit when the communication service is not of a continuous data communication and the demodulated signal includes user communication data, monitors an accumulation status of the demodulated signal in the demodulated data storage unit, checks the number of remaining resources for channel decoding processes when a demodulated signal is accumulated, and allocates an available resource for a channel decoding process after reading the accumulated demodulated signal from the demodulated data storage unit when there is an available resource for a channel decoding process, and
the resource management unit attaches a time stamp to the demodulated signal and accumulates the demodulated signal when temporarily accumulating the demodulated signal in the demodulated data storage unit, checks a time period during which the read demodulated signal has been stored in the demodulated data storage unit using the time stamp when reading, from the demodulated data storing unit, the demodulated signal that has been accumulated, allocates an available resource for a channel decoding process when a storage time period is within a prescribed time period and discards the demodulated signal when the storage time period has exceeded the prescribed time period.

2. The radio base station according to claim 1, wherein:
the channel decoding process resource is allocated only when there is user communication data in the received signal in the communication service that is not of the continuous data communication.

3. The radio base station according to claim 1, further comprising:
a despreading process unit to generate a demodulated signal by executing a despreading process on a received signal by using the despreading process resource;

a channel decoding process unit to decode the demodulated signal by using at least one of the plurality of the channel decoding process resources.

4. The radio base station according to claim 3, wherein:
available resources for channel decoding processes are allocated according to priority using user communication data rate information when the available resources for the channel decoding processes are allocated.

5. The radio base station according to claim 1, wherein:
the resource management unit notifies a higher layer that a signal cannot be received when there is no available resource for a channel decoding process.

6. The radio base station according to claim 1, wherein:
the resource management unit manages resources for despreading processes of a despreading process unit generating a demodulated signal by executing the despreading process on a received signal, and a resource for a channel decoding process of a channel decoding process unit decoding the demodulated signal, and:
the resource management unit allocates an available resource for the despreading process of the received signal when there is an available resource for the despreading process when receiving a resource allocation request from the higher layer for processing the received signal, determines the type of communication service of the received signal when there is an available resource for a channel decoding process, allocates the available resource for a channel decoding process when the communication service is of a continuous data communication, and does not allocate the resource for a channel decoding process when the communication service is not of a continuous data communication.

7. The radio base station according to claim 1, wherein:
available resources for channel decoding processes are allocated according to priority using user communication data rate information when the available resources for the channel decoding processes are allocated.

8. A method of allocating a resource for a channel decoding process in a radio base station comprising:
allocating one of a plurality of despreading process resources and determining whether a type of communication service is of a continuous data communication upon receiving a resource allocation request from a higher layer apparatus, allocating a channel decoding process resource when the communication service is determined to be of a continuous data communication, and returning a completion response to the higher layer apparatus and terminating allocation of the channel decoding process resource when the communication service is determined to be not of the continuous data communication, the completion response indicating completion of allocation of the despreading resource, wherein
temporarily accumulating a demodulated signal in a demodulated data storage unit when the communication service is not of a continuous data communication and the demodulated signal includes user communication data, monitoring an accumulation status of the demodulated signal in the demodulated data storage unit, checking the number of remaining resources for channel decoding processes when a demodulated signal is accumulated, and allocating an available resource for a channel decoding process after reading the accumulated demodulated signal from the demodulated data storage unit when there is an available resource for a channel decoding process, and
attaching a time stamp to the demodulated signal and accumulating the demodulated signal when temporarily accumulating the demodulated signal in the demodulated data storage unit, checking a time period during which the read demodulated signal has been stored in the demodulated data storage unit using the time stamp when reading, from the demodulated data storing unit, the demodulated signal that has been accumulated, allocating an available resource for a channel decoding process when a storage time period is within a prescribed time period and discarding the demodulated signal when the storage time period has exceeded the prescribed time period;
after the despreading process is completed, determining whether a type of communication service is of a continuous data communication for data on which the despreading process was executed, wherein
when the communication service is determined to be of the continuous data communication, the allocated channel decoding process resource executes the channel decoding process;
when the communication service is determined to be not of the continuous data communication, further confirming presence/absence of user communication data; when there is user communication data, allocating the channel decoding process resource; and when there is no user communication data, terminating allocation of the channel decoding process resource.

* * * * *